L. B. MULLINS.
FISH STRINGER.
APPLICATION FILED SEPT. 16, 1907.
918,462.
Patented Apr. 13, 1909.
Fig. 1.
Fig. 2.
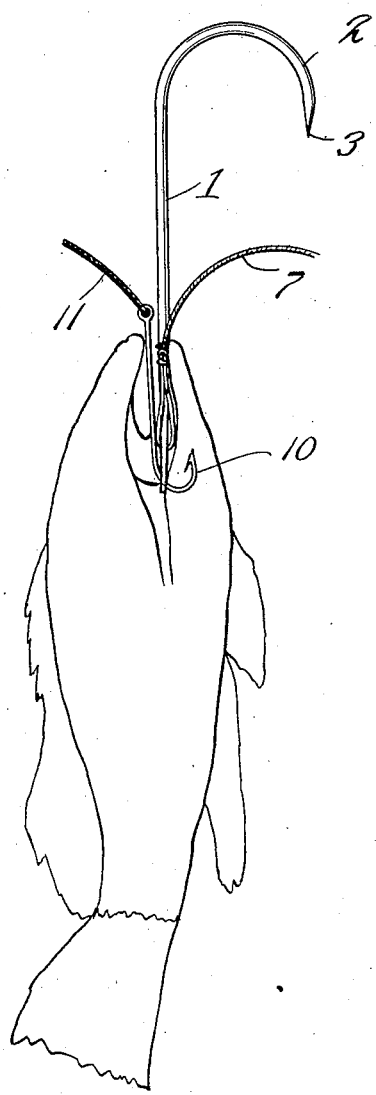
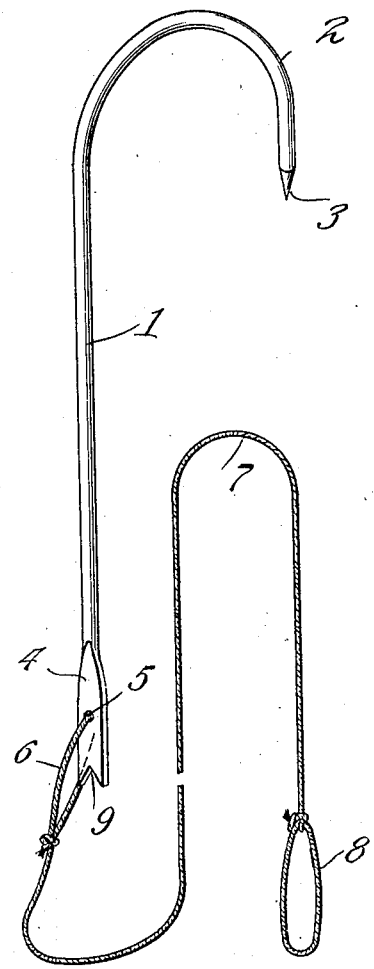
Witnesses
Frank B. Hoffman
Inventor
Latham B. Mullins
By Victor J. Evans
Attorney

UNITED STATES PATENT OFFICE.

LATHAM B. MULLINS, OF L'ARGENT, LOUISIANA.

FISH-STRINGER.

No. 918,462.   Specification of Letters Patent.   Patented April 13, 1909.

Application filed September 16, 1907. Serial No. 393,166.

*To all whom it may concern:*

Be it known that I, LATHAM B. MULLINS, a citizen of the United States, residing at L'Argent, in the parish of Concordia and State of Louisiana, have invented new and useful Improvements in Fish-Stringers, of which the following is a specification.

This invention relates to fish stringing devices and one of the principal objects of the same is to provide a hook shaped stringer adapted to be passed through the mouth and gills of a fish, said hook having a string or line connected thereto upon which the fish are strung and said hook having a flattened shank provided with a notch for engaging a fish hook to remove the same from the mouth of a fish.

Another object of the invention is to provide a useful device for stringing fish, said device being available for removing a fish hook which has been swallowed by a fish or which has been caught in the gills.

These and other objects may be attained by means of the construction illustrated in the accompanynig drawing, in which:—

Figure 1 is a side view of the stringing device shown in position to detach a fish hook from a fish. Fig. 2 is an enlarged perspective view of the stringing device.

Referring to the drawing for a more specific description of my invention, the numeral 1 designates the shank of a stringing hook or threader, said shank terminating at one end in a curved hook 2 having a pointed end 3. The opposite end of the shank 1 is flattened as at 4 and a hole 5 is formed in the flattened portion for the loop 6 of the stringing line 7, said stringing line being provided with a loop 8 for a suitable cross piece or stop. The terminal end of the flattened portion 4 is provided with a notch 9, the purpose of which will presently appear. The hook 2 is designed for the purpose of passing through the mouth and gill of the fish for stringing the same upon the line 7, the hook 2 thus serving as a handle by means of which the string of fish may be conveniently carried.

Should the fish hook 10 attached to the line 11 be swallowed by a fish or be connected to a gill or other part of a fish which would render the hook difficult to detach, the shank 1 is moved down upon the shank of the fish hook until the notched end engages the bent portion of the fish hook 10, when by pushing downward upon the hook portion 2 the fish hook becomes detached from the fish and can be readily removed.

My invention is of simple construction, can be manufactured at slight cost and has been found very efficient for its purpose.

Having thus described the invention, what is claimed as new, is:—

In a fish stringer, the combination with a stringing line having a loop at one end, a stop engaged with said loop, of a threader having a shank bent at one end to form a hooked portion having a pointed end, said hooked portion adapted to be used as a handle, said shank having an eye formed adjacent to its end for receiving the terminal end of the stringing line.

In testimony whereof I affix my signature in presence of two witnesses.

LATHAM B. MULLINS.

Witnesses:
  F. J. MCGRAW,
  J. C. SWOR.